United States Patent [19]
Naville et al.

[11] Patent Number: 5,305,285
[45] Date of Patent: Apr. 19, 1994

[54] METHOD AND APPARATUS FOR SUBSOIL EXPLORATION INCLUDING EMISSION OF A SERIES OF SEISMIC IMPULSES

[75] Inventors: Charles Naville, Grigny; Hubert Japiot, Paris, both of France

[73] Assignee: Institut Francais du Petrole, Rueil Malmaison Cedex, France

[21] Appl. No.: 46,921

[22] Filed: Apr. 14, 1993

Related U.S. Application Data

[63] Continuation of Ser. No. 821,086, Jan. 16, 1992, abandoned.

[30] Foreign Application Priority Data

Jan. 16, 1991 [FR] France ................... 91 00608

[51] Int. Cl.$^5$ .............................................. G01V 1/36
[52] U.S. Cl. ........................................ 367/49; 367/41
[58] Field of Search ................ 367/38, 39, 41, 44, 367/45, 57, 59

[56] References Cited

U.S. PATENT DOCUMENTS

| | | | |
|---|---|---|---|
| 3,327,805 | 6/1967 | Glazier et al. | 367/49 |
| 3,622,970 | 11/1971 | Sayous et al. | 367/41 |
| 3,952,280 | 1/1974 | Altes | 367/100 |
| 4,293,935 | 10/1981 | Gros et al. | 367/41 |
| 4,346,461 | 8/1982 | Muir | 367/39 |
| 4,543,632 | 9/1985 | Ergas et al. | 367/39 |
| 4,926,391 | 5/1990 | Rector et al. | 367/41 |

FOREIGN PATENT DOCUMENTS 0331585 9/1989 European Pat. Off. .

OTHER PUBLICATIONS

*Journal of the Acoustical Society of America*, vol. 36, No. 1, Jan. 1964, pp. 121-139, New York, US; W. B. Allen et al.: "Digital compressed-time correlators and matched filters for active sonar".

*Primary Examiner*—Ian J. Lobo
*Attorney, Agent, or Firm*—Antonelli, Terry, Stout & Kraus

[57] ABSTRACT

Seismic impulses irregularly distributed in time (according to a random or a pseudorandom code for example) are transmitted into the soil, and the direct waves and those reflected by the subsoil discontinuities are picked-up by a reception system (G). The frequency spectrum of the emitted and the received signals is divided into several bands, and the components of the signals in each one of the bands are reduced to elementary signals indicating the change of sign thereof (sign bit) and are recorded. Cross-correlation of the elementary signals respectively associated with the emitted and the received signals and stacking of the cross-correlation products associated with each sensor are carried out thereafter for each sensor of the reception system, and seismic sections very comparable to what would be obtained by digitizing the signals received with full precision, as in conventional methods, are achieved with the obtained stacks.

13 Claims, 6 Drawing Sheets

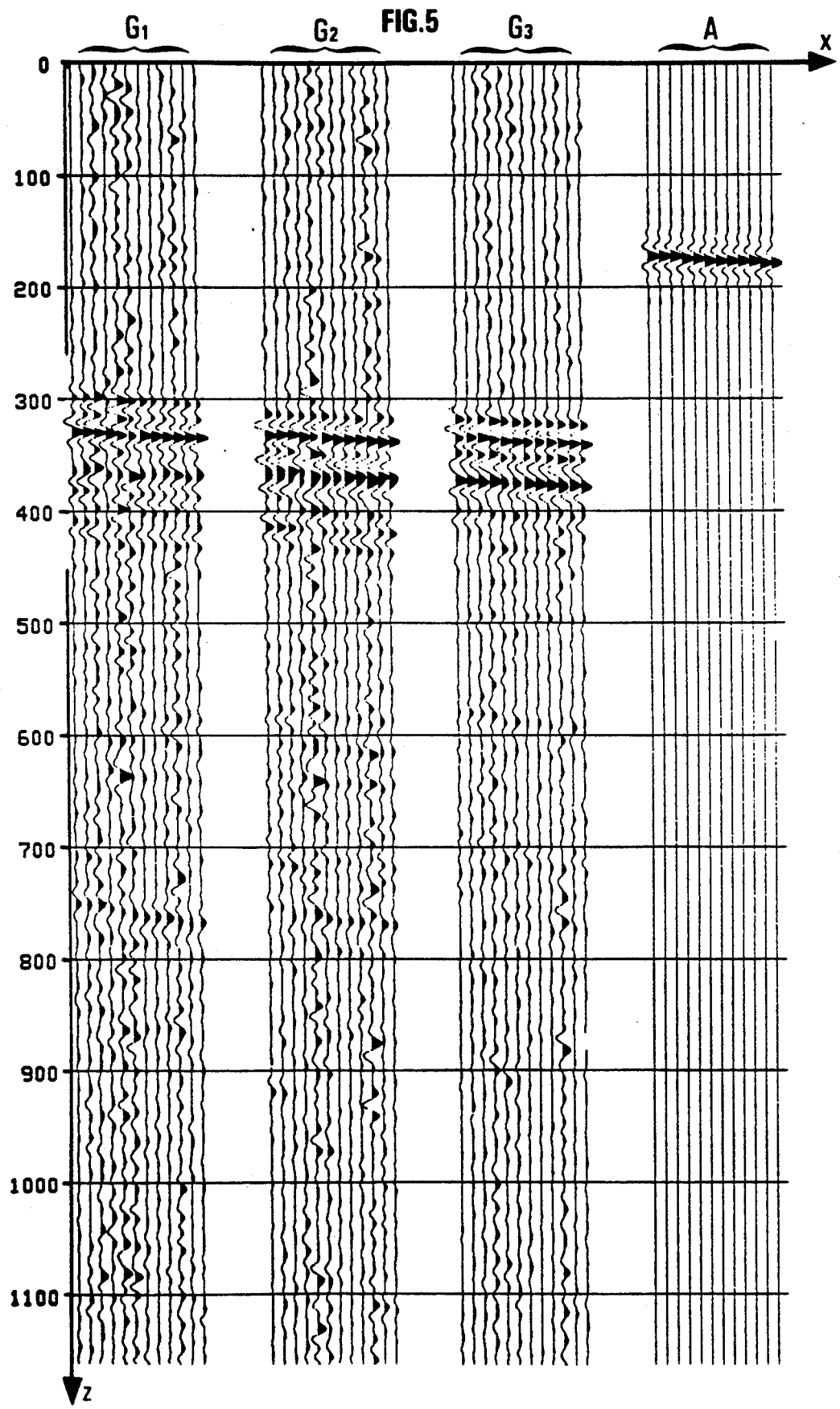

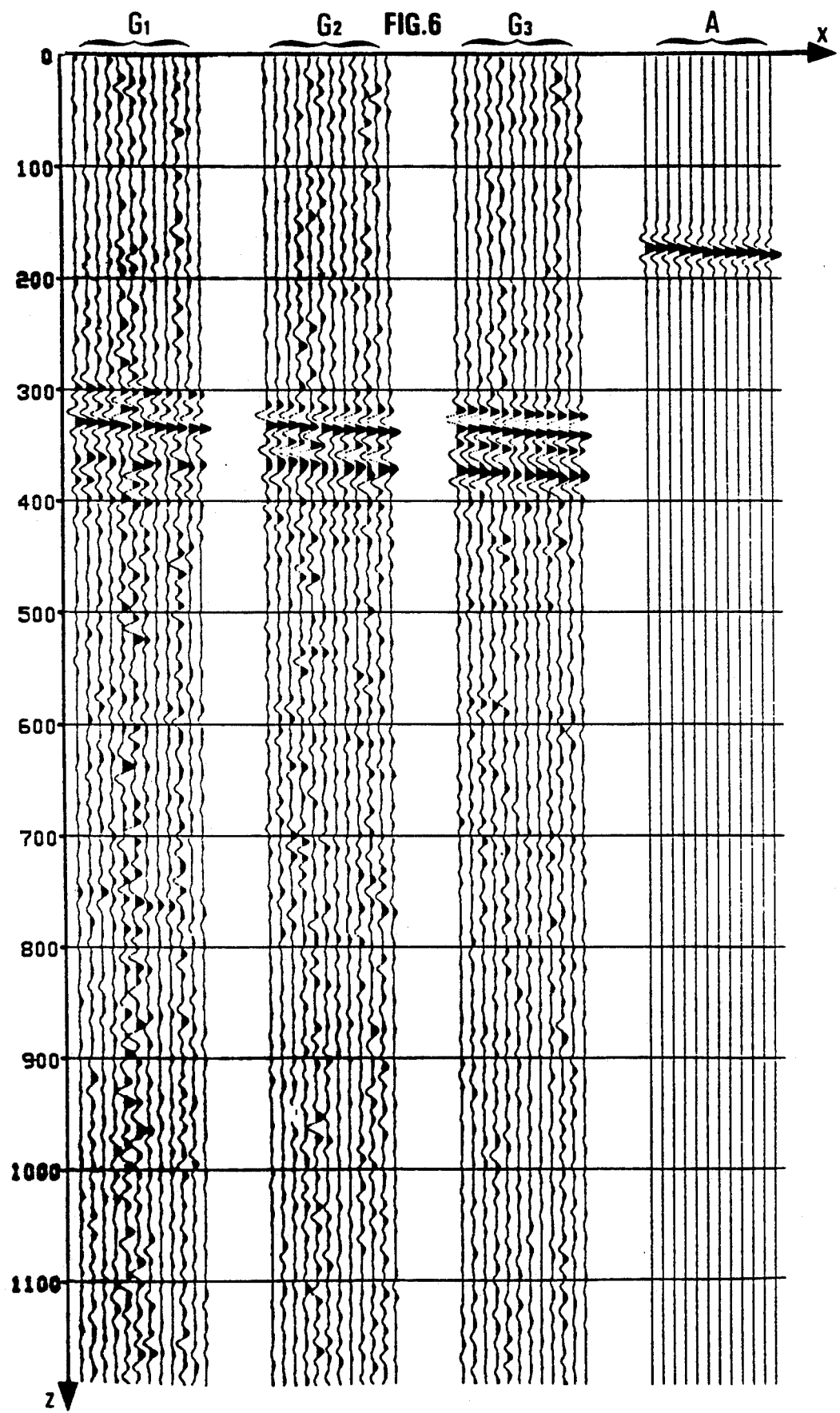

METHOD AND APPARATUS FOR SUBSOIL EXPLORATION INCLUDING EMISSION OF A SERIES OF SEISMIC IMPULSES

This application is a continuation of application Ser. No. 07/821,086, filed Jan. 16, 1992, abandoned.

BACKGROUND OF THE INVENTION

The object of the invention is to provide a seismic exploration method and device permitting the emission into subsoil formations a series of seismic impulses irregularly distributed in time.

More particularly, the invention relates to a seismic prospecting method and device making it possible to locate the position of subsoil discontinuities, for example by exploiting the sign bit associated with the waves picked-up after the propagation thereof by a reception and acquisition system located at the surface or in a well following the emission of such a series of acoustic waves.

The method and the device according to the invention are particularly suitable for seismic prospecting operations on land around a well in the process of being drilled in order to restore the position of subsurface reflectors, if a drill bit producing seismic impulses as it moves forward in the crossed formations, such as a conventional rock bit, is used.

Seismic prospecting methods generally comprise emitting, into the formations to be prospected, seismic waves in the form of vibrations or impulses, receiving the waves which are propagated into the subsoil by a reception array comprising a plurality of sensors, recording the picked-up waves and processing recordings by a series of processing steps so as to improve the readability of seismic sections achieved from these recordings.

Methods through which the seismic waves are emitted by a source progressing with a drill bit and received by an array of sensors arranged at the surface are well-known through French Patent No. 1,584,951, U.S. Pat. Nos. 2,933,144 and 4,207,619 or patent application PCT WO85/05,696 for example. The waves can be produced by the drill bit itself in contact with the rocks to be drilled, or they can result from impacts applied to the drill bit during the progressing thereof, or else by a vibrating source interposed on the drill string.

A conventional process consists (through an operation known as cross-correlation) in cross-correlating each seismic trace obtained, as a whole, with the emitted signal, also as a whole, and then, by stacking, in combining it with other traces which have also been cross-correlated and which relate to common depth points (CDP).

U.S. Pat. Nos. 4,058,791, 4,346,461 or 4,543,632, for example, describe some applications of one general principle to seismic prospecting. According to this principle, the previous treatments are carried out from signals reduced to the signs therefo by clipping. The emitted signals are long-lasting vibrations whose frequency varies uniformly within a definite frequency spectrum, either uniformly or according to a pseudorandom code. The signals are emitted by a vibrating source arranged on the land surface or towed behind a ship within the framework of offshore seismic prospecting operations. Seismic methods implying selecting and treating only the sign bit are advantageous because the volume of data to be processed is substantially restricted, and the number of sensors and of seismic acquisition channels can therefore be increased. However, these prior methods are only fully efficient with particular vibrating sources.

SUMMARY OF THE INVENTION

The seismic exploration method according to the present invention makes it possible to apply the same principle to acoustic or impulse seismic sources. The method comprises in combination:

emitting an irregular series of impulse seismic signals;

receiving the seismic signals;

dividing the frequency spectrum of the received signals and of the emitted impulse signals into several frequency bands;

in each one of said bands formed thereby, reducing the received signals to sequences of elementary signals indicative of the respective signs or sign bits thereof;

in each one of said frequency bands also, reducing the emitted impulse signals to sequences of elementary signals indicative of the respective signs or sign bits thereof;

cross-correlating in each frequency band the elementary signals respectively associated with the emitted and the received signals; and filtering the signals resulting from the cross-correlations performed in each one of said frequency bands through filters with appropriate pass-bands.

The method can also comprise stacking the signals resulting from the different cross-correlations achieved after the filtering thereof. According to a particular embodiment procedure, signal adaptation is carried out before the stacking.

According to one embodiment, the irregular emission of impulse seismic signals is achieved, for example, by means of a drill bit during the progressing thereof in a well, and the seismic signals are received by seismic sensors arranged to obtain a two-dimensional or a three-dimensional restoring of the explored zone.

The seismic sensors are, for example, arranged on the land surface around the wellbore or else in a wellbore.

According to another embodiment, the irregular emission of impulse seismic signals is achieved by means of a source arranged on the land surface or close to it.

According to an embodiment procedure, the irregular emission of impulse signals consists of a series of randomly or pseudorandomly distributed impulses.

The subsoil seismic exploration device according to the invention comprises:

a seismic source for emitting an irregular series of seismic impulses;

a seismic reception system for picking up the waves, comprising an array of sensors and first filtering means for separating into several adjacent frequency bands the spectrum of the signals received by each sensor, and first clipping means for reducing each constituent signal to an elementary signal indicative of the sign thereof at any time or sign bit, the seismic source being associated with second filtering means for separating into several adjacent frequency bands, identical to those of the first filtering means, the spectrum of the signal emitted by the source, and with second clipping means for reducing each constituent signal coming from the second filtering means to a sign bit;

a central control and recording laboratory comprising a processing array with means for cross-correlating the respective elementary signals coming from the first and the second clipping means, digital filtering means for filtering in each one of said frequency bands the signals coming from the cross-correlation means, and means for stacking separately for each one of the sensors the cross-correlated signals in connection with one position of the source.

The seismic source is for example a drill bit brought into rotation, and the reception system comprises, for example, a plurality of sensors arranged in proximity to the well in the process of being drilled. This drill bit can, for example, be associated with hydraulic means applying intermittent vertical stresses to the drill bit.

The reception system comprises, for example, acquisition devices linked to the central laboratory by transmission means, in order to collect each of the signals received by several sensors, each acquisition device being fitted with first filtering means and first clipping means, the central laboratory having recording means for storing said elementary signals transmitted by the acquisition devices and a computer including said cross-correlations means and said stacking means.

Each acquisition device can also comprise means for temporarily storing said elementary signals.

According to another embodiment, the emission of a random series of impulse seismic signals is achieved by means of a source arranged on the land surface or close to it.

The method and the device according to the invention make it possible to apply to impulse emissions the general principle of the treatment implying the storing and the processing of the only sign bit of the received signals. The method and device make it therefore possible to perform 3-D seismic prospecting operations, for example during drilling by deploying a very large number of sensors and acquisition channels in favourable economic conditions.

The method according to the invention makes it possible to produce under advantageous conditions 3-D images, for example, with a resolution analogous to the one which is generally provided by conventional methods but in more advantageous conditions. This is due to the fact that the digitized information is very reduced in comparison with the information which is necessary with the conventional methods carrying out a full-precision digitization, because the number of frequency bands subdividing the seismic band is relatively small in practice.

BRIEF DESCRIPTION OF THE DRAWINGS

Other features and advantages of the method and the device according to the invention will be clear from reading the description hereafter of embodiments given by way of non limitative examples, with reference to the accompanying drawings in which:

FIGS. 5 and 6 show two seismic recordings respectively obtained by applying a conventional method and the acquisition and treatment method according to the invention in the same frequency band, the conventional method utilizing complete seismic signals measured with full precision.

DESCRIPTION OF THE PREFERRED EMBODIMENTS

The method according to the invention can be implemented for example around a well 1 into which a source of seismic impulses is taken down. This source can be a drill bit 2 fastened to the base of a string 3 and capable of emitting such impulses. A drill bit such as a three-cone bit brought into rotation (rotary drilling) which, as is checked, emits sufficiently powerful impulses that are randomly distributed in time, is, for used. It is also possible to use, for example, drill bits associated with means 4 to apply percussion to them, or sources of the SOSIE (R) type, such as those described in U.S. Pat. No. 3,483,514.

The method is preferably implemented during the drilling of the hardest subsurface beds, in order to obtain impacts with a higher amplitude.

The seismic impulses go through the geological formations surrounding the well, and, after reflecting and/or refracting on the subsoil discontinuities, they are received at the surface by an array of sensors G such as geophones or accelerometers. The sensors are arranged along a line in the case in which a seismic profiling plane (2-D) is to be restored or are distributed at the surface in the case of prospecting known as 3-D prospecting.

Figure 1:
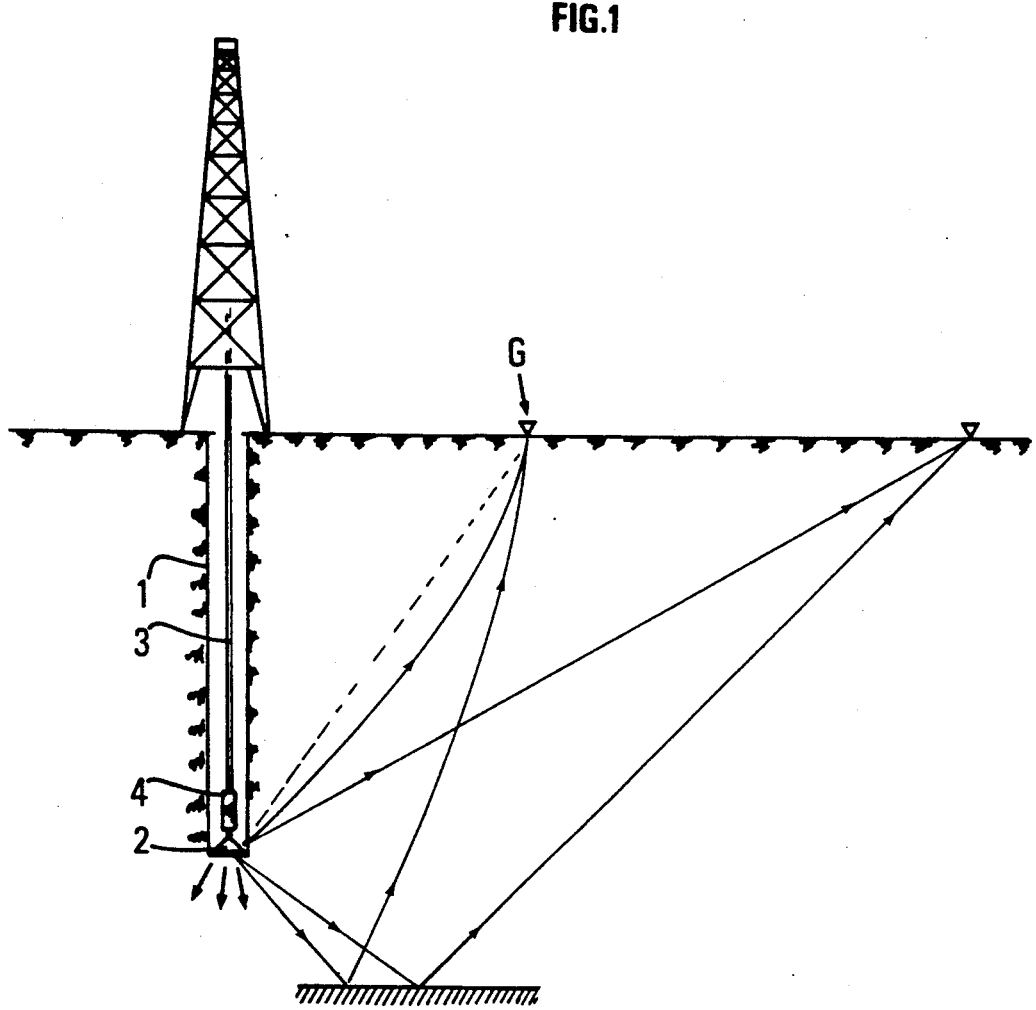
FIG. 1 diagrammatically shows a seismic emission-reception system in the case in which the emission of seismic impulses is achieved by a drill bit.
Figure 2:
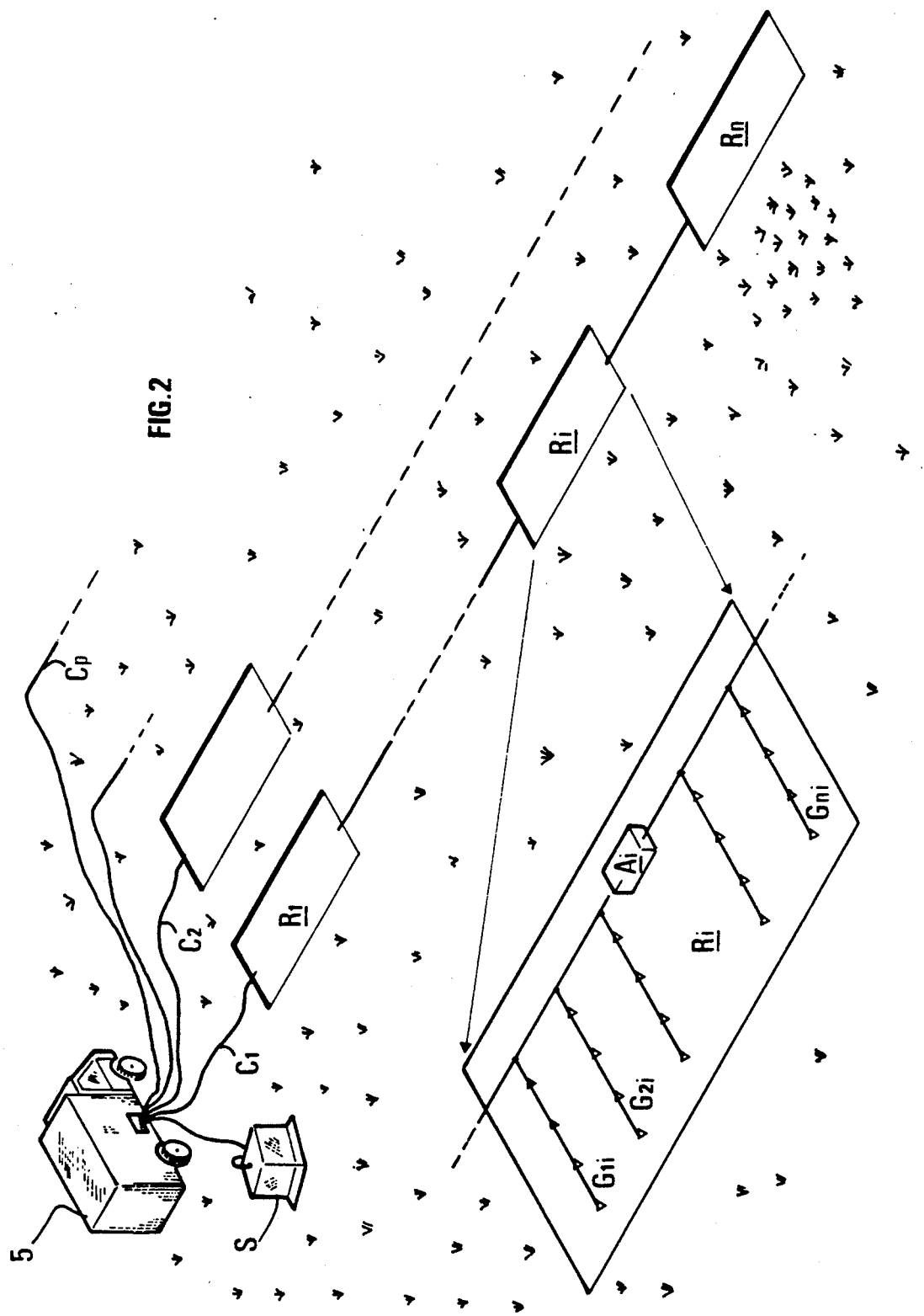
FIG. 2 shows an example of a reception system adapted for 2-D or 3-D seismic prospecting.

The seismic reception system can comprise for example one or several transmission cables C1, C2 ... Cp (FIG. 2). Each cable is linked to a central control and recording laboratory 5 and to one or several reception arrays R1 ... Ri ... Rn. Each one of these arrays comprises, for example, several strings of interconnected sensors G1i, G2i ... Gmi, each one joined to a signal acquisition device Ai adapted for collecting the received signals and for transmitting the signals to the central laboratory 5. An impulse seismic source S is also connected to the recording truck 5; this source can be a surface source, as shown by rod 2, or the aforementioned drill bit.

The implementing of the method according to the invention comprises dividing the frequency spectrum of the emitted and received impulse signals into a plurality of adjacent bands (at least two), reducing the signals in each frequency band to the sole bit sign thereof and transmitting to the central laboratory 5 the obtained sign bit sequences in order to record them.

One or several sensors are therefore arranged in the most appropriate place to provide signals representative of the series of impulses emitted by source S. These source or pilot signals can be sampled in proximity to the source when it is at the surface. When the source is a drill bit, the source signals can be picked at the top of the drill string or underground, in proximity to the drill bit. In these cases, a transmission system such as the TELEVIGILE (R) described in published French patent application FR 2 656 747 (or Ser. No. 636,273) can, for example, be used.

Figure 3:
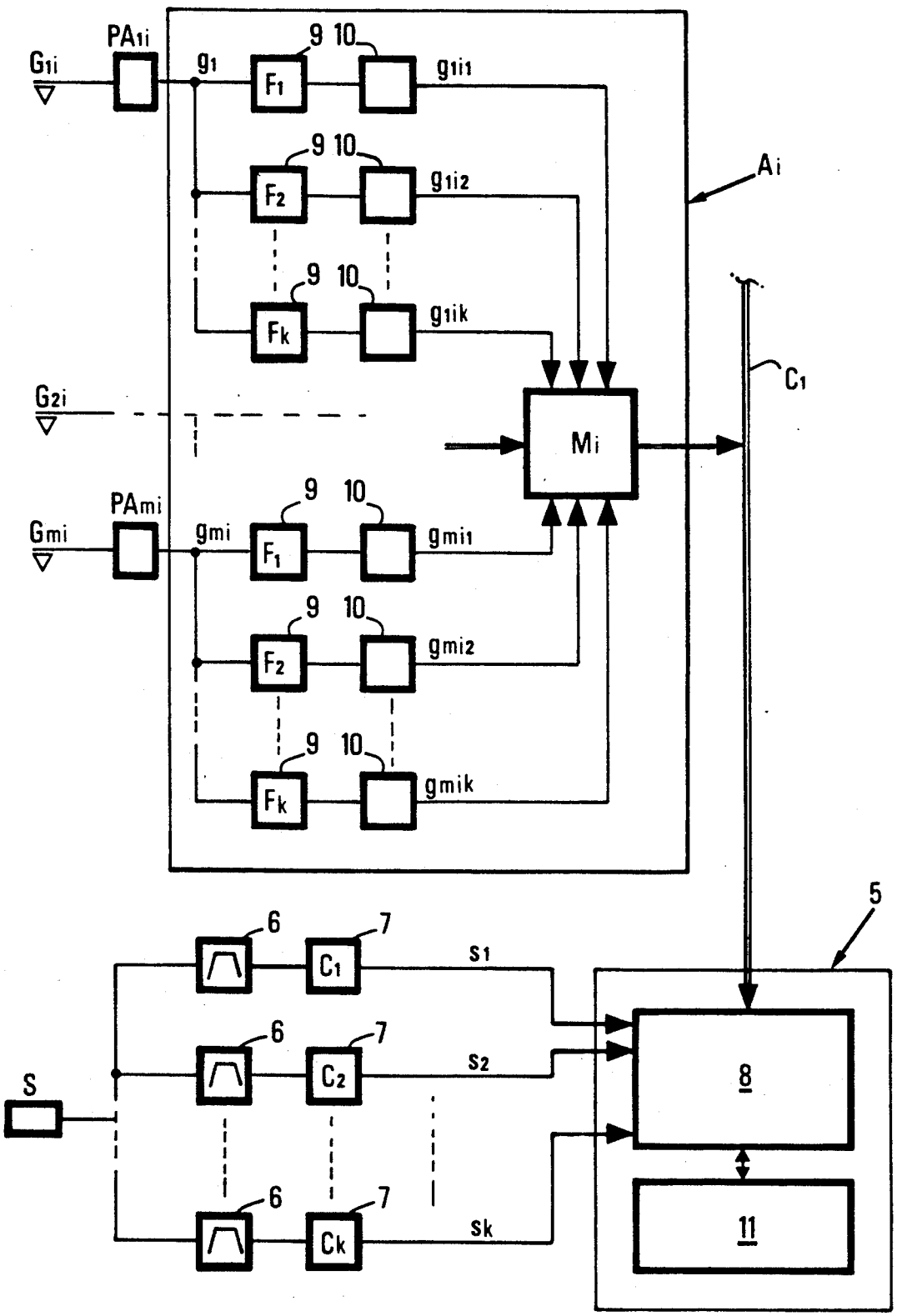
FIG. 3 is a block diagram of the device according to the invention.

The pilot signal obtained being in this case a series of impulses, it is applied to several band-pass filters 6 with adjacent frequency bands F1, F2 ... Fk (k being at least equal to two) covering the total emission spectrum (FIG. 3). The respective outputs of the filters 6 are respectively connected to clipping circuits 7 of the clipper type which produce at the respective outputs thereof logical signals indicative of the sign (sign bits) s1, s2 ... sk thereof. These signals are transferred into a storing or recording means 8 of central laboratory 5.

The signals received by each one of the sensors are treated in the same way. Signal g1i received by sensor G1i of the array Ri (FIG. 2) is applied, after passing through a preamplifier PA1i, at the input of several additional band-pass filters 9 whose respective pass-bands F1, F2 ... Fk are identical to those of filters 6. The signals coming from the filters 9 are applied to clippers 10 which produce at the respective outputs thereof a series of sign bits g1i1, g1i2 ... g1ik which are stored in a local memory Mi. It is the same for the signals g2i ... gmi received by the other sensors G2i ... Gmi respectively. The sequences of sign bits gmi1, gmi2 ... gmik which are also stored in the local memory Mi correspond to the signal gmi produced by sensor Gmi for example.

At the end of each reception period, all the sign bits stored in the local memory Mi are transferred by different cables C1 ... Cp into storing means 8 of the central laboratory 5.

The treatment of the sign data stored in storing means 8 comprises:

- cross-correlating each series of sign bits associated with the signals emitted in each one of the additional frequency bands with each series of sign bits associated with the signals received by each sensor of the reception system;
- filtering the signals resulting from the cross-correlations achieved in each one of said frequency bands through filters with a pass-band adapted to those of band-pass filters 6;
- stacking the contributions due to a single sensor, after the cross-correlation thereof, this being performed for each one of the sensors of the reception system in the field; and
- forming seismic sections from the stackings.

The processing stages are preferably completed by conventional CDP stacking, for example in order to improve the readability of the obtained seismic sections.

Figure 4:
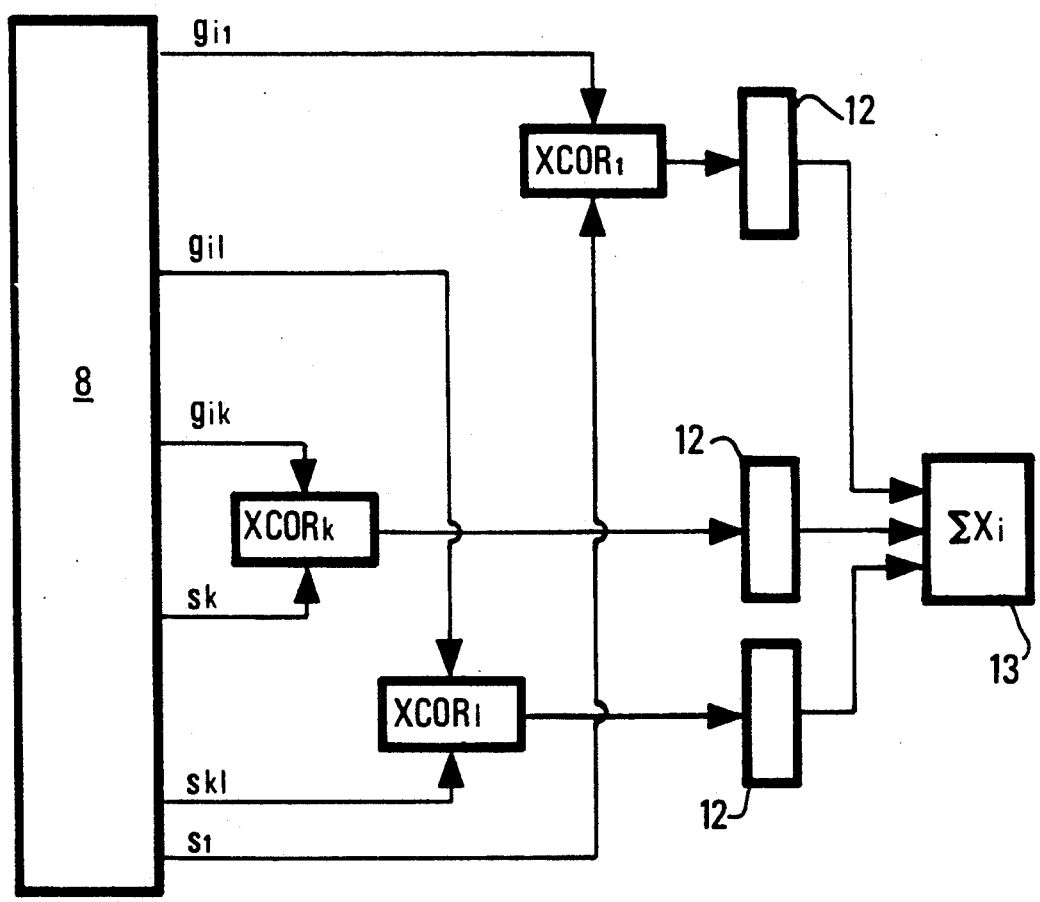
FIG. 4 shows a block diagram of the treatment assembly which is included in the device and which carries out the processing of the data reduced to the sign bits thereof.

The previous treatment operations are achieved in a treating unit 11 included in the central laboratory 5. This treating unit can comprise (FIG. 4) specialized processors XCOR1 ... XCOR2 ... XCORk connected to storage means 8. The sequences of sign bits gi1 ... gi1 ... gik associated with the signals received by any sensor Gi of the reception system and coming from each bank of filters 6 with adjacent frequency bands F1 to Fk are respectively cross-correlated with the corresponding sequences s1 to sk of the emitted signals. The outputs of the specialized processors are respectively connected to digital filters 12 whose pass-bands are adapted to those of filters 6. Using these digital filters 12 is justified in practice by the fact that the clipping achieved by clippers 10 generates parasitic frequencies which did not exist in the spectrum of the received signals. The outputs of the digital filters 12 are connected to the different inputs of a adder or stacker 13 which filters and adds all the contributions. A stacker which can perform a particular weighting of the signals to be stacked can, for example, be used.

Treating unit 11 can also be a programmable computer and, in this case, the previous treatment operations are achieved by programming the computer.

FIGS. 5 and 6 attest the validity of the method. They show series of 12 traces, each one successively produced by three geophones G1, G2, G3 and an accelerometer A displaced in a series of locations along a seismic profile. For each rating, the signals picked up in response to a sequence of impulses lasting for example two minutes have been recorded. The emitted frequency spectrum (from 20 to 80 Hz for example) has been subdivided into two octaves: 20–40 Hz and 40–80 Hz. FIG. 5 shows the seismic section which has been obtained with a conventional method including sampling and full-precision, generally 16-bit digitizing of the received signals. FIG. 6 shows the result obtained with the method according to the invention. After subdividing into two octaves (20 to 40 Hz) and (40 to 80 Hz) for example, clipping, keeping the sequences of sign bits, cross-correlating and stacking as described above, a raw seismic recording which bears a very good resemblance with the one of FIG. 5 obtained with a conventional method is obtained, without needing a seismic acquisition device as complete and as high-powered as the one which is commonly used with conventional methods.

A seismic reception system with sensors located in a well could also be utilized without departing from the scope of the invention.

We claim:

1. A method of applying sign-bit representation to seismic events, in the processing of seismic signals obtained from subsoil seismic exploration during drilling of a wellbore using as a seismic signal source a drill bit that emits an irregular series of impulses, having a random frequency spectrum, while progressing in the wellbore during drilling thereof, said method comprising the steps of:

activating the drill bit to emit an irregular series of impulse seismic signals having a random frequency spectrum;

receiving the seismic signals after passage thereof through a seismic formation; and processing the received seismic signals in real time by:

(a) dividing the frequency spectrum of the received signals and the emitted impulse signals into a plurality of frequency bands;

(b) within each of said frequency bands, producing from the received signals sequences of elementary signals indicative of the respective signs or sign bits of the received signals;

(c) within each of said frequency bands, producing from the emitted impulse seismic signals sequences of elementary signals indicative of the respective signs or sign bits of the emitted signals;

(d) cross-correlating within each frequency band the elementary signals respectively indicative of the emitted signals and the received signals;

(e) filtering the signals resulting from the cross-correlations performed in each of said frequency bands through filters with an adapted pass-band; and (f) stacking the filtered signals resulting from step (e).

2. A method as claimed in claim 1, further comprising, before step (f), adjusting the filtered signals.

3. A method as claimed in claim 1 or 2 wherein, step (b) comprises receiving the seismic signals with distributed seismic sensors to obtain a two-dimensional or a three-dimensional restoring of the explored zone.

4. A method as claimed in claim 3 wherein the seismic sensors are arranged on the land surface around a drilled well.

5. A method as claimed in claim 3 wherein the seismic sensors are arranged in the wellbore.

6. A method as claimed in claim 1 wherein step (a) comprises activating the drill bit to emit a series of randomly or pseudorandomly distributed impulses.

7. An apparatus for applying sign-bit representation to seismic events, in the processing of seismic signals obtained from subsoil seismic exploration using as a seismic signal source a drill bit that emits an irregular series of impulses, having a random frequency spectrum, during drilling of a wellbore, said apparatus comprising:
a drill bit which emits an irregular series of seismic impulses having a random frequency spectrum, while progressing in the wellbore during drilling thereof;
a seismic reception system for receiving seismic impulses from said drill bit after reflection by subsoil discontinuities, said seismic reception system including an array of sensors, first filtering means for separating the spectrum of signals received by each sensor into a plurality of constituent signals having adjacent frequency bands, and first processing means for producing from each constituent signal from the first filtering means an elementary signal indicative of the sign or sign bit of the constituent signal at any time;
second filtering means for separating into a plurality of adjacent frequency bands, identical to the frequency bands of the first filtering means, the spectrum of the signals emitted by the seismic source;
second processing means for producing from each constituent signal from the second filtering means an elementary signal indicative of the sign or sign bit of such constituent signal at any time;
a central control and recording laboratory including a processing array having means for cross-correlating the respective elementary signals from the first and second processing means, digital filtering means for filtering in each one of said frequency bands the signals from the cross-correlating means, and means for separately stacking for each one of the sensors the signals cross-correlated in connection with one position of the source.

8. An apparatus as claimed in claim 7, wherein the reception system comprises a plurality of sensors arranged in proximity to the wellbore.

9. An apparatus as claimed in claim 8, further comprises hydraulic means for applying intermittent vertical stresses to the drill bit.

10. An apparatus as claimed in any one of claims 7 to 9, wherein:
the reception system comprises transmission means, and acquisition devices connected with the central control and recording laboratory through the transmission means for collecting the signals received by the sensors; and
said central laboratory comprises storing means for storing said elementary signals transmitted by the acquisition devices, and a computer including said cross-correlation means and said stacking means.

11. An apparatus as claimed in claim 10, wherein each acquisition device comprises means for temporarily storing said elementary signals.

12. A method of processing seismic signals obtained from subsoil seismic exploration using a seismic signal source that emits an irregular series of impulses, said method comprising the steps of:
activating the seismic signal source to emit an irregular series of impulse seismic signals having a random frequency spectrum;
receiving the seismic signals after passage thereof through a seismic formation; and
processing the received seismic signals in real time by:
(a) dividing the frequency spectrum of the received signals and the emitted impulse signals into a plurality of frequency bands;
(b) within each of said frequency bands, producing from the received seismic signals sequences of elementary signals indicative of the respective signs or sign bits of the received signals;
(c) within each of said frequency bands, producing from the emitted seismic signals sequences of elementary signals indicative of the respective signs or sign bits of the emitted signals;
(d) cross-correlating within each frequency band the elementary signals respectively indicative of the emitted signals and the received signals;
(e) filtering the signals resulting from the cross-correlations performed in each of said frequency bands through band-pass filters; and
(f) stacking the filtered signals resulting from step (e).

13. An apparatus for applying sign-bit representation to seismic events, in the processing of seismic signals obtained from subsoil seismic exploration using a seismic signal source that emits an irregular series of impulses having a random frequency spectrum, said apparatus comprising:
an impulse seismic source for emitting an irregular series of seismic impulses having a random frequency spectrum;
a seismic reception system for receiving seismic impulses from said source after reflection by subsoil discontinuities, said seismic reception system including an array of sensors, first filtering means for separating the spectrum of signals received by each sensor into a plurality of constituent signals having adjacent frequency bands, and first processing means for producing from each constituent signal from the first filtering means an elementary signal indicative of the sign or sign bit of the constituent signal at any time;
second filtering means for separating into a plurality of adjacent frequency bands, identical to the frequency bands of the first filtering means, the spectrum of the signals emitted by the seismic source;
second processing means for producing from each constituent signal from the second filtering means an elementary signal indicative of the sign or sign bit of such constituent signal at any time;
a central control and recording laboratory including a processing array having means for cross-correlating the respective elementary signals from the first and second processing means, digital filtering means for filtering in each one of said frequency bands the signals from the cross-correlating means, and means for separately stacking for each one of the sensors the signals cross-correlated in connection with one position of the source.

* * * * *